United States Patent
Huang et al.

(10) Patent No.: US 11,621,640 B2
(45) Date of Patent: Apr. 4, 2023

(54) MULTIPHASE POWER CONVERTER AND CONTROL CIRCUIT AND CONTROL METHOD THEREOF

(71) Applicant: SILERGY SEMICONDUCTOR TECHNOLOGY (HANGZHOU) CO., LTD., Hangzhou (CN)

(72) Inventors: Fusong Huang, Hangzhou (CN); Xiao Han, Hangzhou (CN)

(73) Assignee: SILERGY SEMICONDUCTOR TECHNOLOGY (HANGZHOU) CO., LTD., Hangzhou (CN)

( * ) Notice: Subject to any disclaimer, the term of this patent is extended or adjusted under 35 U.S.C. 154(b) by 49 days.

(21) Appl. No.: 17/405,148

(22) Filed: Aug. 18, 2021

(65) Prior Publication Data

US 2022/0060115 A1    Feb. 24, 2022

(30) Foreign Application Priority Data

Aug. 21, 2020 (CN) .......................... 202010850161.5

(51) Int. Cl.
*H02M 3/158* (2006.01)
*H02M 1/00* (2006.01)

(52) U.S. Cl.
CPC .......... *H02M 3/1586* (2021.05); *H02M 1/007* (2021.05); *H02M 1/0077* (2021.05); *H02M 3/1584* (2013.01)

(58) Field of Classification Search
CPC ... H02M 1/007; H02M 1/0077; H02M 3/1584
See application file for complete search history.

(56) References Cited

U.S. PATENT DOCUMENTS 7,002,325 B2    2/2006  Harris et al.
8,922,177 B2 *  12/2014 Ren ..................... H02M 3/1584
                                                            323/282

(Continued)

FOREIGN PATENT DOCUMENTS

CN       1609742 A    4/2005
CN     102237782 A    11/2011
(Continued)

OTHER PUBLICATIONS

Office Action, including search report, for Chinese Patent Application No. 202010850161.5, dated May 6, 2021, 8 pages.

*Primary Examiner* — Gary A Nash
(74) *Attorney, Agent, or Firm* — Westman, Champlin & Koehler, P.A.

(57) ABSTRACT

The present disclose relates to a multiphase power converter and control circuit and control method thereof. The multiphase power converter comprises a plurality of power stage circuits, and each power stage circuit corresponds to one control circuit, each of the control circuit comprises a first port and a second port, wherein the first ports are connected to each other to receive centralized control signal, and the second port is configured to identify a phase sequence of each phase. The control circuit adjusts a working state of the current power stage circuit by gating corresponding pulse in the centralized control signal according to the centralized control signal and a current phase sequence, thereby realizing an interleaved control of the multiphase power converter. The control method realizes a uniform interleaving of control signals of each phase efficiently and simply, and further improves a power density of the multiphase power converter.

24 Claims, 8 Drawing Sheets

(56) References Cited

U.S. PATENT DOCUMENTS

| | | | |
|---|---|---|---|
| 9,106,201 B1* | 8/2015 | Chakraborty | G05F 1/461 |
| 9,407,147 B2* | 8/2016 | Lee | H02M 3/1584 |
| 9,559,591 B2* | 1/2017 | Hang | H02M 3/1584 |
| 2004/0041543 A1* | 3/2004 | Brooks | H02M 3/1584 |
| | | | 323/212 |
| 2005/0083024 A1 | 4/2005 | Harris et al. | |
| 2011/0254531 A1 | 10/2011 | Markowski | |
| 2017/0019026 A1* | 1/2017 | Nien | H02M 3/1584 |
| 2019/0074770 A1* | 3/2019 | Trichy | H02M 1/44 |
| 2019/0181746 A1* | 6/2019 | Chen | H02M 3/156 |
| 2021/0028704 A1 | 1/2021 | Jiang et al. | |

FOREIGN PATENT DOCUMENTS

| | | | | |
|---|---|---|---|---|
| CN | 109586565 A | * | 4/2019 | H02M 3/10 |
| CN | 110445380 A | | 11/2019 | |

\* cited by examiner

MULTIPHASE POWER CONVERTER AND CONTROL CIRCUIT AND CONTROL METHOD THEREOF

CROSS-REFERENCE TO RELATED APPLICATION

This application claims priority to the Chinese Patent Application No. 202010850161.5, filed on Aug. 21, 2020 and entitled "MULTIPHASE POWER CONVERTER AND CONTROL CIRCUIT AND CONTROL METHOD THEREOF", which are incorporated herein by reference in its entirety in this disclosure.

BACKGROUND OF THE DISCLOSURE

Field of Technology

The present disclosure relates to the technical field of power electronics, in particular to a multiphase power converter and control circuit and control method thereof.

Description of the Related Art

Usually, a multiphase parallel power supply requires a controller to control the switches of each phase converter. FIG. 1 shows a circuit block diagram of a multiphase power converter in prior art. In this embodiment, an interleaved parallel connection of three-phase power converters is taken as an example. The power converter is a buck converter, and phases are P1, P2, and P3. The multiphase power converter adopts a centralized controller to modulate an output voltage, and then generates control signals PWM1-PWM6 for switches of each phase converter. It should be understood that the controller usually has peripherals or integrated circuit modules such as error amplifiers, clock circuits, oscillators, PWM generators, etc., so that the controller is relatively complex and bulky.

SUMMARY

In order to solve the above technical problem, the present disclosure provides a multiphase power converter and control circuit and control method thereof, efficiently and simply realizes a uniform interleaving of control signals of each phase, and further improves a power density of the multiphase power converter.

According to a first aspect of the present disclosure, there is provided control circuit of a multiphase power converter, wherein the multiphase power converter comprises a plurality of power stage circuits, and each power stage circuit corresponds to one control circuit, the control circuit comprising:

a first port coupled to first ports of the control circuits corresponding to other power stage circuits for transmitting a centralized control signal; and a second port configured to identify a phase sequence of the control circuit, wherein the centralized control signal comprises a plurality of pulses in each control period, and at least one pulse is different from other pulses so as to allocate each pulse to a corresponding control circuit, so that each power stage circuit is controlled in turn.

Further, the control circuit is configured to control a current power stage circuit by gating a corresponding pulse in the centralized control signal according to the centralized control signal and the phase sequence.

Further, in each of the control periods, the pulses of the centralized control signal have a same phase difference.

Further, in each of the control periods, the pulse of the centralized control signal is modulated to include at least two kinds of pulse amplitudes or two kinds of pulse widths.

Further, an initial pulse of the centralized control signal in the control period has a pulse amplitude or a pulse width different from other pulses, wherein the initial pulse is configured to control the power stage circuit corresponding to a main converter.

Further, each pulse of the centralized control signal in the control period has different pulse amplitudes or pulse widths.

Further, a resistive element is connected to the second port to identify the phase sequence of the control circuit according to a voltage or a current of the second port.

Further, the control circuit further comprises:

a main control unit configured to generate the centralized control signal according to an output voltage of the multiphase power converter when the control circuit is a main control circuit; and a signal selection circuit configured to control a current power stage circuit by gating a corresponding pulse in the centralized control signal according to the centralized control signal and the phase sequence.

Further, the main control unit comprises:

a feedback control circuit configured to generate a main control signal according to a reference signal and a feedback signal characterizing the output voltage of the multiphase power converter.

Further, the main control unit further comprises:

a pulse modulation circuit configured to modulate a pulse of the main control signal to generate the centralized control signal when the control circuit is the main control circuit.

Further, the main control unit further comprises:

a phase separation control circuit connected to the feedback control circuit, is configured to disperse a pulse of the main control signal whose effective level time exceeds a first threshold into a plurality of pulses with a same interval time without changing the pulse whose effective level time does not exceed the first threshold, thereby generating a first centralized control signal;

a pulse modulation circuit configured to modulate a pulse of the first centralized control signal to generate the centralized control signal when the control circuit is the main control circuit.

Further, the signal selection circuit is configured to count the pulses of centralized control signal in each control period and select a pulse whose count value matches a current phase sequence to control the current power stage circuit.

Further, the signal selection circuit is configured to select a pulse in the centralized control signal whose pulse amplitude or pulse width matches a reference interval corresponding to a current phase sequence to control the current power stage circuit.

Further, the signal selection circuit comprises:

a phase sequence identification circuit configured to identify a current phase sequence according to a voltage or a current of the second port;

a counting circuit configured to count the pulses of the centralized control signal in each control period;

a detection circuit configured to clear the count value when an arrival of each initial pulse is detected; and a phase distribution circuit configured to select the pulse to output whose count value matches the current phase sequence.

Further, the signal selection circuit comprises:

a phase sequence identification circuit configured to identify a current phase sequence according to a voltage or a current of the second port; and a phase distribution circuit configured to receive the current phase sequence to obtain the reference interval corresponding to the current phase sequence, and select the pulse to output whose pulse amplitude or pulse width belong to the reference interval to control the current power stage circuit.

Further, the signal selection circuit comprises:

a phase sequence identification circuit configured to identify a current phase sequence according to a voltage or a current of the second port;

a detection circuit configured to determine the phase sequence corresponding to the pulse according to the reference interval to which the pulse amplitude or the pulse width of each pulse in the centralized control signal belongs, wherein each phase sequence is respectively set with a corresponding reference interval; and a phase distribution circuit configured to select the pulse to output whose pulse amplitude or pulse width matches a reference interval corresponding to a current phase sequence to control the current power stage circuit.

According to a second aspect of the present disclosure, there is provided a multiphase power converter, comprising:

a plurality of power stage circuits connected in parallel, wherein an input port of each power stage circuit is coupled to an input voltage, and an output port is coupled to a load; and the plurality of control circuits described above, wherein each of the power stage circuits corresponds to one of the control circuits, and one of the plurality of control circuits is configured as the main control circuit, the rest are secondary control circuits.

According to a third aspect of the present disclosure, there is provided a control method of a multiphase power converter, comprising:

generating a centralized control signal according to an output voltage of the multiphase power converter; and gating a corresponding pulse in the centralized control signal according to the centralized control signal and a phase sequence of a current power stage circuit to control the current power stage circuit, wherein the centralized control signal comprises a plurality of pulses in each control period, and at least one pulse is different from other pulses so as to allocate each pulse to a corresponding control circuit, so that each power stage circuit is controlled in turn.

Further, the control method further comprising:

generating a main control signal according to a reference signal and a feedback signal characterizing the output voltage of the multiphase power converter; and modulating a pulse of the main control signal to generate the centralized control signal when the control circuit is the main control circuit.

Further, the control method further comprising:

when effective level time of a pulse of the main control signal exceeds a first threshold, the pulse is dispersed into a plurality of pulses with a same interval time before modulating;

Further, the control method further comprising:

modulating pulse amplitude or pulse width of an initial pulse of the centralized control signal in each control period to be different from other pulses.

Further, the control method further comprising:

counting the pulses of the centralized control signal in each control period;

clearing a count value when an arrival of each initial pulse is detected; and controlling the current power stage circuit by selecting a pulse to output whose count value matches a current phase sequence.

Further, the control method further comprising:

modulating each pulse of the centralized control signal in the control period to have a different pulse amplitude or pulse width.

Further, the control method further comprising:

setting a reference interval corresponding to each phase sequences; and selecting the pulse to output whose pulse amplitude or pulse width matches the reference interval corresponding to a current phase sequence to control the current power stage circuit.

In summary, the multiphase power converter of the present disclosure has multiple power stage circuits, and each power stage circuit has a corresponding control circuit. Each control circuit includes a first port and a second port, the first ports are connected to each other to receive the centralized control signal, and the second port is configured to identify the phase sequence of each phase. The control circuit adjusts a working state of the current power stage circuit by gating corresponding pulse in the centralized control signal according to the centralized control signal and a current phase sequence, thereby realizing an interleaved control of the multiphase power converter. The control method efficiently and simply realizes a uniform interleaving of control signals of each phase, and further improves a power density of the multiphase power converter.

BRIEF DESCRIPTION OF THE DRAWINGS

The above and other objectives, features and advantages of the present disclosure will become more apparent from the description of embodiments of the present disclosure below with reference to the accompanying drawings.

DETAILED DESCRIPTION OF THE DISCLOSURE

The present disclosure will be described below based on examples, but the present disclosure is not limited to these examples. In the following detailed description of the present disclosure, some specific details are described in detail. Those skilled in the art can fully understand the present disclosure without the description of these details. In order to avoid obscuring the essence of the present disclosure, the well-known methods, processes, procedures, components and circuits are not described in detail.

In addition, those of ordinary skill in the art should understand that the drawings provided herein are for illustrative purposes, and the drawings are not necessarily drawn to scale.

At the same time, it should be understood that in the following description, "circuit" refers to a conductive loop formed by at least one element or sub-circuit through electrical or electromagnetic connection. When an element or circuit is referred to as being "connected to" another element or an element/circuit is referred to as being "connected" between two nodes, it can be directly coupled or connected to the other element or there may be intervening elements. The connection can be physical, logical, or a combination thereof. On the contrary, when an element is referred to as being "directly coupled to" or "directly connected to" another element, it means that there is no intervening element between the two.

Unless the context clearly requires, the entire specification and claims, "including", "comprising" and other similar phrases should be interpreted as inclusive rather than exclusive or exhaustive meaning; i.e., "including but not limited to".

In the description of the present disclosure, it should be understood that the phrases "first", "second", etc. are only used for descriptive purposes, and cannot be understood as indicating or implying relative importance. In addition, in the description of the present disclosure, unless otherwise specified, "plurality" means two or more.

Figure 2:
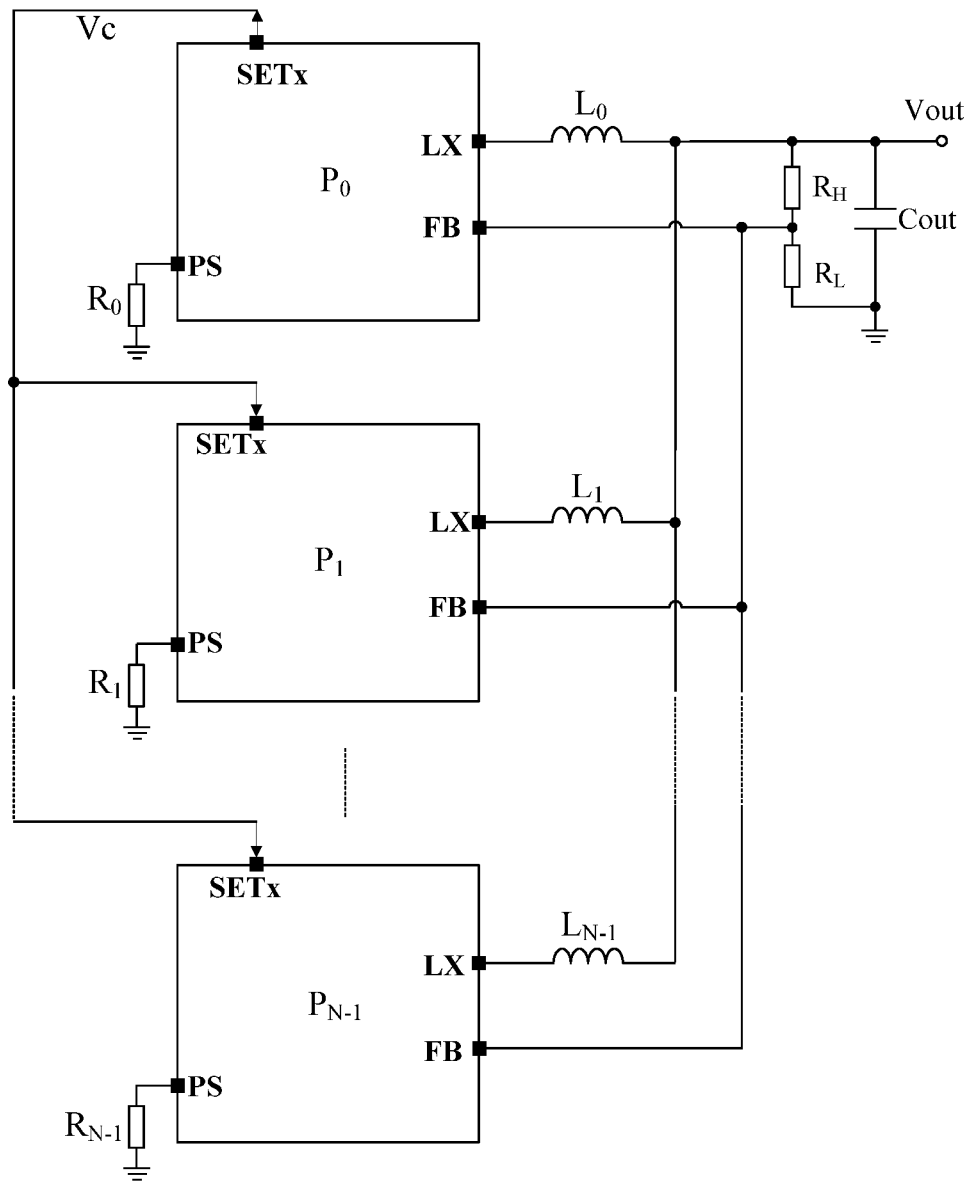
FIG. 2 shows a circuit block diagram of an example multiphase power converter according to the embodiments of the present disclosure.

FIG. 2 shows a circuit block diagram of a multiphase power converter according to the embodiments of the present disclosure. As shown in FIG. 2, the multiphase power converter has N phases, which are $P_0, P_1, \ldots, P_{N-1}$. In this embodiment, a buck converter is taken as an example for description, and it should be understood that the present disclosure is also applicable to any other power converters. In this embodiment, a main power transistor, a rectifier transistor, and a control circuit in the buck converter are integrated in one control chip. A common connection point of the main power transistor and the rectifier transistor is LX, and inductances ($L_0, L_1, \ldots, L_{N-1}$) are respectively arranged outside the control chip and connected to the common connection point LX. It should be understood that the main power transistor and the rectifier transistor of the buck converter may also be arranged outside the control chip, and at the same time, the rectifier transistor may be a power transistor or a diode.

Figure 1:
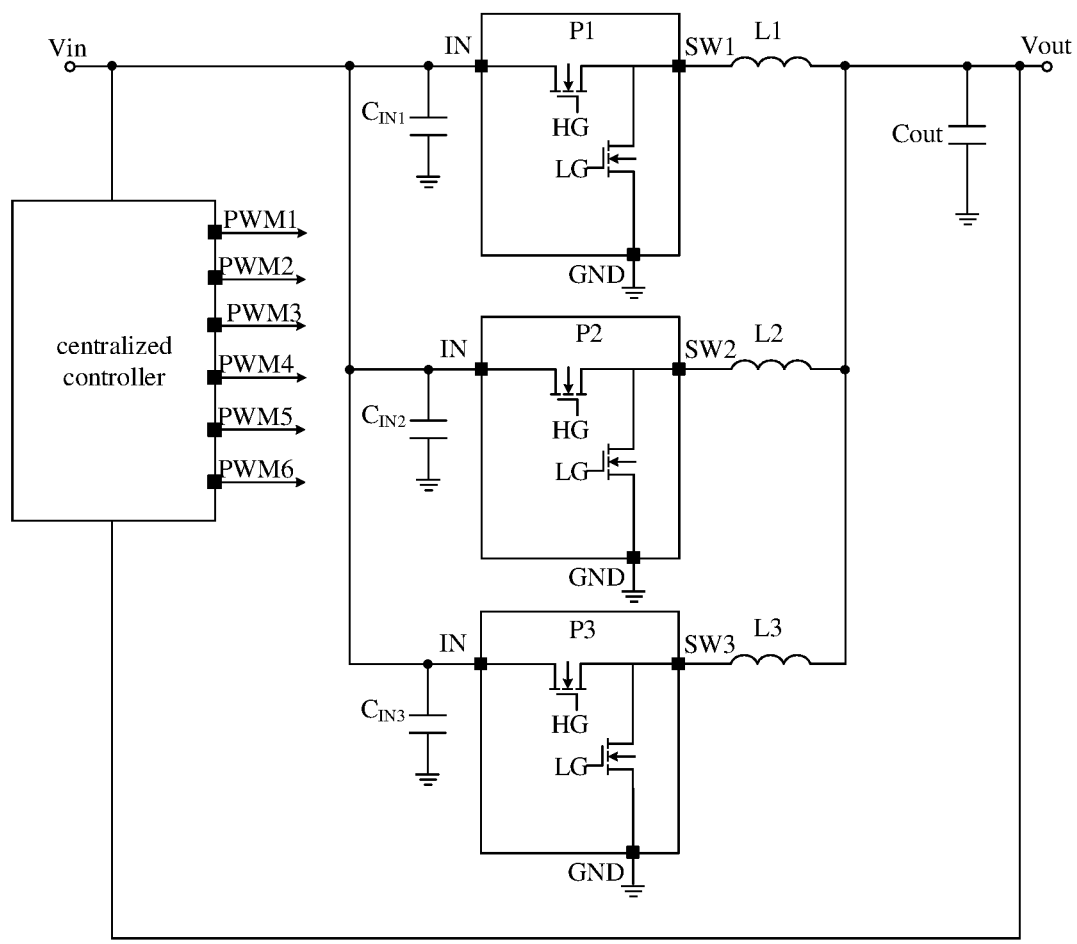
FIG. 1 shows a circuit block diagram of a multiphase power converter in prior art.

Different from FIG. 1, in the multiphase power converter of the embodiment of the present disclosure, each phase power converter has a corresponding control circuit to control a switching state of each phase power converter. Each control circuit includes a first port SETx and a second port PS, wherein the first port SETx is configured to transmit a centralized control signal Vc, and each first port SETx is connected to each other; the second port PS is configured to identify a phase sequence of each phase control circuit, where the phase sequence represents an actual working sequence of each phase power converter, which has nothing to do with a physical location of each phase power converter. In some embodiments, each second port PS is connected with a resistor (R0, R1, ..., RN−1) with different resistances to identify a current phase sequence according to voltage or current information at the second port PS. In addition, each control circuit also includes a third port FB, which is connected to each other to obtain a feedback signal representing a common output voltage Vout.

In this embodiment, the first phase power converter $P_0$ is a main phase, and other phase power converters $P_1$ to $P_{N-1}$ are the secondary phases. A control circuit corresponding to the main phase is a main control circuit, and is configured to generate the centralized control signal Vc at the first port SETx according to the feedback signal of the output voltage Vout and transmit it to the first port SETx of other control circuits. It should be understood that the centralized control signal Vc is generated by the main control circuit, but it includes control signals for controlling other phase power converters to achieve interleaved control of each phase. In this embodiment, the centralized control signal Vc includes a plurality of pulses, and there are N pulses in each control period, and the power converters of each phase are triggered to provide power to the load in turn according to the phase sequence. In a steady state, the phase difference between each pulse is $2\pi/N$, where a phase corresponding to each control period is $2\pi$. The corresponding control circuit receives the centralized control signal Vc through the first port SETx, and the pulse corresponding to the current phase sequence is identified from the centralized control signal Vc to control the current phase power converter.

Figure 3:
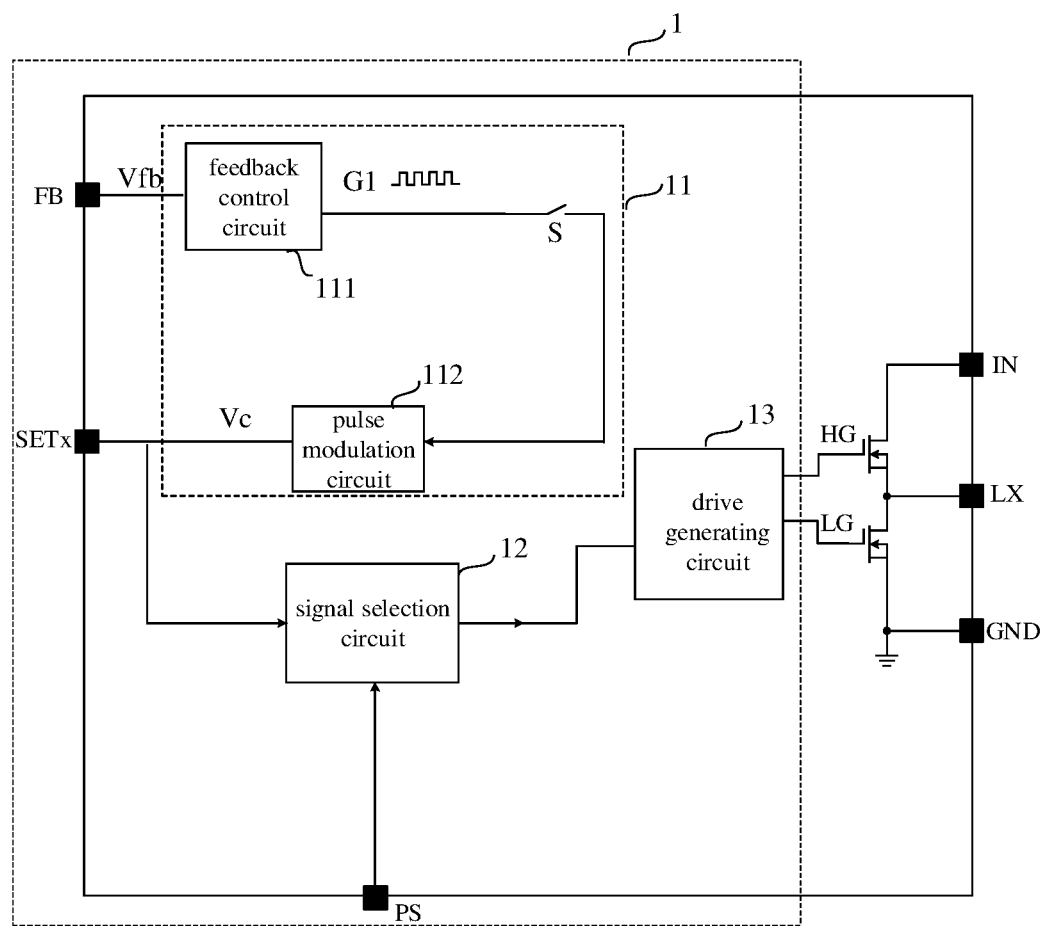
FIG. 3 shows a circuit block diagram of a first example control circuit according to the embodiments of the present disclosure.

FIG. 3 shows a circuit block diagram of a first example control circuit according to the embodiments of the present disclosure. The control circuit 1 includes a main control unit 11 and a signal selection circuit 12. The main control unit 11 is configured to generate the centralized control signal Vc according to the feedback signal Vfb obtained by the third port FB and transmit it to the first port SETx of each phase, wherein the centralized control signal Vc has at least one pulse different from other pulses so as to identify the control circuit corresponding to each pulse.

Specifically, the main control unit 11 includes a feedback control circuit 111 and a pulse modulation circuit 112. The feedback control circuit 111 is configured to generate a main control signal G1 according to an error between the feedback signal Vfb characterizing the output voltage Vout and a reference signal characterizing an expected value of the output voltage Vout.

The pulse modulation circuit 112 is configured to modulate the main control signal to generate the centralized control signal Vc when the control circuit is the main control circuit, so that at least one pulse of the centralized control signal Vc in each control period is different from other pulses to match each pulse with the corresponding control circuit, thereby each power stage circuit is controlled in turn. It should be understood that a difference between the pulses may be a different pulse amplitude, a different pulse width, and so on. The main control unit 11 further includes a switch S. When the control circuit is the main control circuit, the switch S is turned on, so that the pulse modulation circuit 112 will work to generate a centralized control signal Vc and transmit it to each first port SETx. In the control circuits corresponding to the secondary phases, the switch S in the main control unit 11 is off.

The signal selection circuit 12 is configured to control a current converter by gating a corresponding pulse from the plurality of pulses in the centralized control signal Vc according to the phase sequence of the control circuit identified by the centralized control signal Vc transmitted by the first port SETx and the voltage or the current information at the second port PS.

The control circuit 1 further includes a drive generating circuit 13 configured to generate drive signals HG and LG according to the pulses output by the signal selection circuit 12 to drive the main power transistor and the rectifier transistor of the buck converter.

Figure 4:
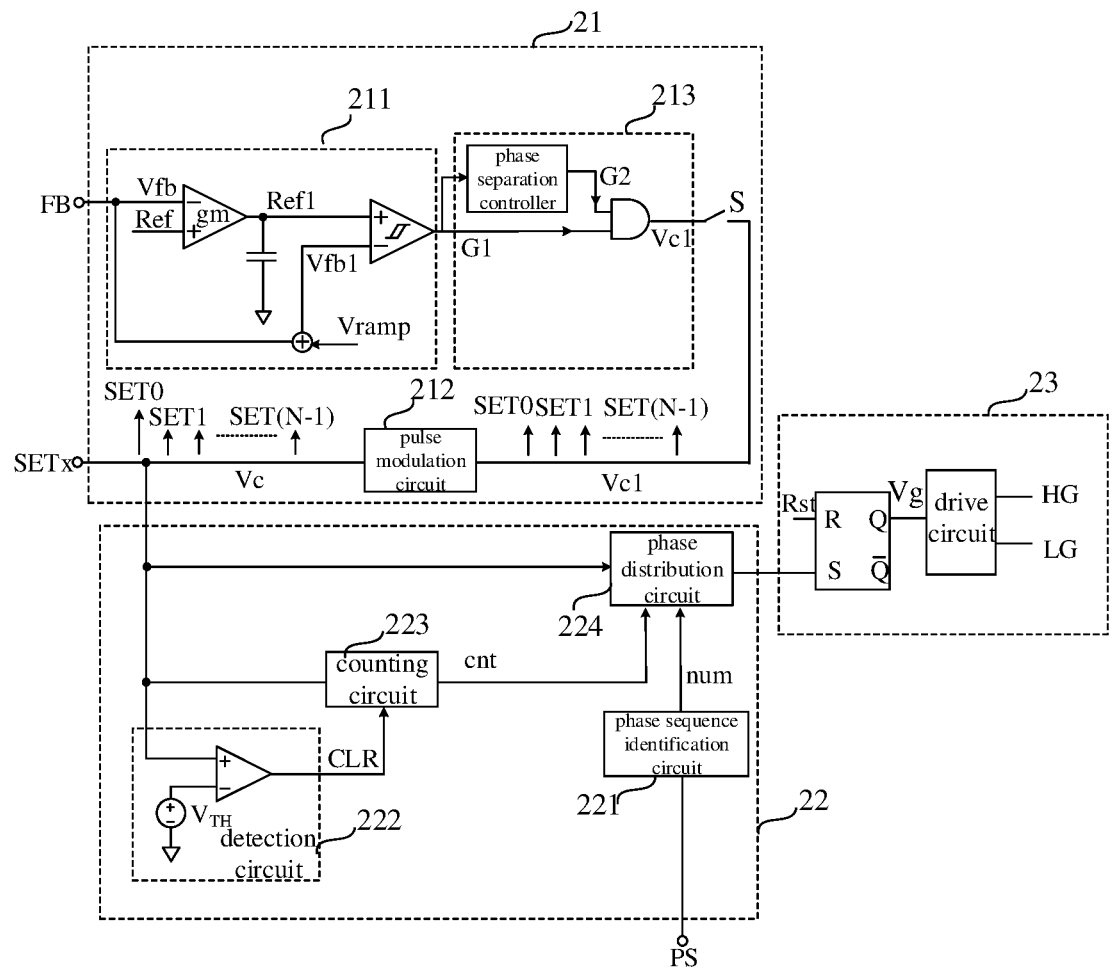
FIG. 4 shows a circuit diagram of a second example control circuit according to the embodiments of the present disclosure.

FIG. 4 shows a circuit diagram of a second example control circuit according to the embodiments of the present disclosure. In this embodiment, the multiphase power converter adopts constant on-time (COT) control. The pulse generated in each phase control circuit is configured to control the main power transistor to turn on. When the main power transistor is turned on for a constant time, a reset signal Rst is effective to control the main power transistor to turn off. As shown in FIG. 4, the feedback control circuit 211 in the main control unit 21 is configured to generate a first reference signal Ref1 according to the error between the feedback signal Vfb and the reference signal Ref. The first reference signal Ref1 is compared with the first feedback signal Vfb1 to generate the main control signal G1. Specifically, when the first feedback signal Vfb1 is smaller than the first reference signal Ref1, the main control signal G1 generates an effective pulse, where the first feedback signal Vfb1 is a superposition of the feedback signal Vfb and a ramp signal Vramp. It should be understood that the embodiment of the present disclosure only shows one implementation of triggering the turn-on of the power transistor, and any feedback control circuit capable of realizing this function in prior arts can be applied to this. At the same time, those of ordinary skill in the art should understand that other control methods for the multi-phase power converter, such as constant off time control, are also applicable to the embodiments of the present invention.

In addition, in the steady state, a pulse width of the main control signal G1 is very narrow, and when the load jumps from a light load to a heavy load, the output voltage Vout drops, so that the first feedback signal Vfb1 is smaller than the first reference signal Ref1 for a long period of time, resulting in a longer pulse width of the main control signal G1 at this moment, which leads to an excessively long turn-on time of the power transistor of a certain phase, which may lead to an overcurrent of the phase. In order to avoid such a situation when the load jumps, in this embodiment, a phase separation control circuit 213 is additionally provided.

The phase separation control circuit 213 is configured to disperse a pulse of the main control signal G1 whose effective level time exceeds a first threshold into a plurality of pulses with a same interval time without changing the pulse whose effective level time does not exceed the first threshold, thereby generating an output signal G2. In order to improve the stability of the control circuit, the main control signal G1 and the output signal G2 are respectively ANDed to generate a first centralized control signal Vc1.

The first centralized control signal Vc1 in each control cycle includes N pulses, i.e., SET0, SET1, . . . , SET(N−1) and the N pulses are configured to control each power stage circuit separately, where SET0 is an initial pulse of each control cycle used to control the main power transistor of the main converter to turn on, SET1 is used to control the main power transistor of a first secondary converter to turn on, and so on, SET(N−1) is used to control the main power transistor of an (N−1)th secondary converter to turn on. After that, a next control cycle is started, and so on.

In this embodiment, the pulse modulation circuit 212 is configured to receive the first centralized control signal Vc1, and modulate the amplitude of the start pulse (i.e., SET0) in each control period to the first amplitude to distinguish other pulses (=SET1-SET(N−1)) to generate the centralized control signal Vc. Wherein, the first amplitude may be smaller than the second amplitude, or may be greater than the second amplitude. Here, the amplitude of SET0 is greater than the amplitude of other pulses for illustration.

In addition, those of ordinary skill in the art should understand that in order to make the starting pulse different from other pulses, the modulation method is not limited to changing the pulse amplitude, but the pulse width can also be changed. In this case, the detection circuit needs to detect whether the pulse width exceeds the comparison threshold, which is similar to the above and will not be explained here. Those skilled in the art should also understand that the amplitude of other pulses may also be partially different, as long as they are different from the amplitude of the initial pulse.

In this embodiment, the signal selection circuit 22 is configured to count the pulses of centralized control signal Vc and select a pulse whose count value matches a current phase sequence to control the current power stage circuit. Specifically, the signal selection circuit 22 includes a phase sequence identification circuit 221, a detection circuit 222, a counting circuit 223, and a phase distribution circuit 224.

In this embodiment, the phase sequence identification circuit 221 identifies the phase sequence of the phase according to the voltage at the second port PS. Since the resistance connected at the second port PS of each control circuit is different, the voltage detected by it is also different. Each phase sequence identification circuit 221 identifies the phase sequence num of the phase according to the voltage. Wherein, N kinds of different voltage intervals are preset in the phase sequence identification circuit 221, which respectively correspond to a phase sequence. For example, the voltage at the second port PS of the main control circuit is V1, which is within the first voltage interval, and its corresponding phase sequence num is 0. Similarly, the voltage values at the second port PS of other secondary control circuits are also belong to different voltage intervals, so it is identified that the phase sequence num of the power converter of the current phase is 1, 2, . . . , N−1, respectively. It should be understood that the manner of identifying the phase sequence of each phase converter is not limited to this. For example, the current at the PS terminal can also be detected for identification, and any circuit that can realize phase sequence identification falls within the protection scope of the present invention.

The detection circuit 222 is configured to detect an arrival of each initial pulse SET0 and clear the count value when the arrival of each initial pulse SET0 is detected. In some embodiment, the detection circuit 222 includes a comparator, which compares the pulse amplitude of each pulse with the comparison threshold VTH. When the pulse amplitude of a certain pulse is greater than the comparison threshold VTH, it means that the pulse is the initial pulse SET0, thereby generating a clear signal CLR, so that the counting circuit 223 is cleared. When the next pulse SET1 arrives, the count value cnt output by the counting circuit 223 increases by 1, and so on.

The phase distribution circuit 224 is configured to receive the count value cnt and the current phase sequence num. When the count value cnt matches the current phase sequence num, the corresponding pulse is gated for output. Preferably, the phase sequence of the main converter is 0, and the phase sequences of the secondary converters are increased from 1, so that the count value cnt is equal to the phase sequence num. Of course, if the phase sequence of the master converter is 1, the phase sequences of the secondary converters are increased from 2, and the count value cnt also matches each phase sequence.

It should be understood that the phase sequence matching is only taken as an example where the pulse amplitude of the initial pulse is different from other pulses. When the pulse width of the initial pulse is different from other pulses, the matching method is similar to the above, and will not be described here.

The drive generating circuit 23 includes an RS flip-flop and a drive circuit. A set terminal S receives the pulse output by the phase distribution circuit so that an output signal Vg generated by an output terminal Q is set high. After a preset conduction time, a reset terminal R receives a valid reset signal Rst, so that the output signal Vg generated by the output terminal Q is set low. The driving circuit receives the output signal Vg to generate driving signals HG and LG to drive the main power transistor and the rectifier transistor respectively.

Figure 5:
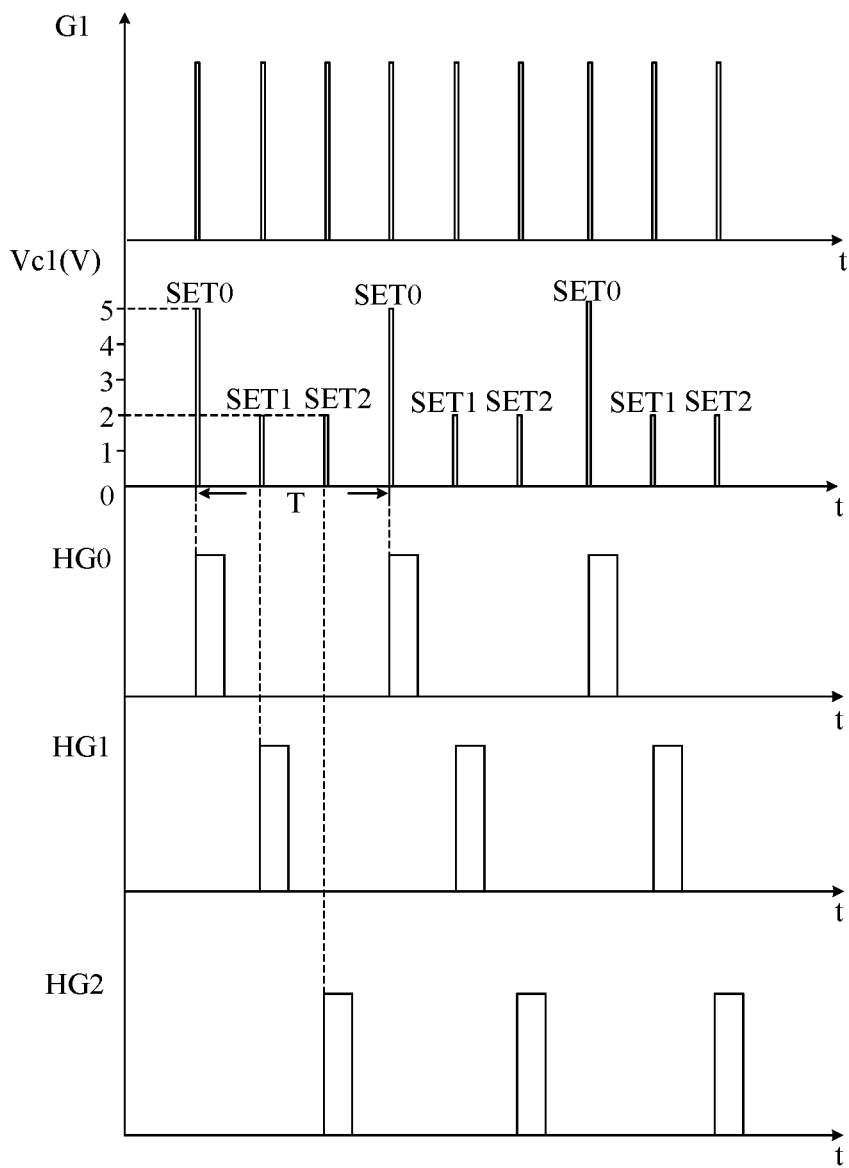
FIG. 5 shows a waveform graph of the second example control circuit according to the embodiments of the present disclosure.

FIG. 5 shows a waveform graph of the second control circuit according to the embodiments of the present disclosure. As shown in FIG. 5, the main control signal G1, the first centralized control signal Vc1, and the drive signals HG0-HG2 of each phase are sequentially shown from top to bottom. As shown in FIG. 5, the first centralized control signal Vc1 includes pulses SET0, SET1, and SET2 in each control period T. After being modulated by the pulse modulation circuit, the pulse amplitude (level) of the initial pulse SET0 is 5V, and the pulse amplitude of the pulses SET1 and SET2 is 2V, so the comparison threshold of the comparator in the detection circuit can be set to a value greater than 2V and less than 5V. When the initial pulse SET0 arrives, since the pulse amplitude is greater than the comparison threshold, the comparator output the valid clear signal CLR, so the count value cnt is zero, and the phase distribution circuit 224 selects SET0 to output according to the count value cnt matching the current phase sequence (phase sequence of the main phase P0 is zero), to generate the drive signal HG0. For the secondary phase P1, when the count value cnt=1, the phase distribution circuit selects SET1 to output according to the count value cnt(cnt=1) matching the current phase sequence (1), thereby generating the drive signal HG1. Similarly, SET2 is selected from the phase distribution circuit of phase P2 to generate the drive signal HG2, thereby realizing the interleaved control of the multiphase power converter.

Figure 6:
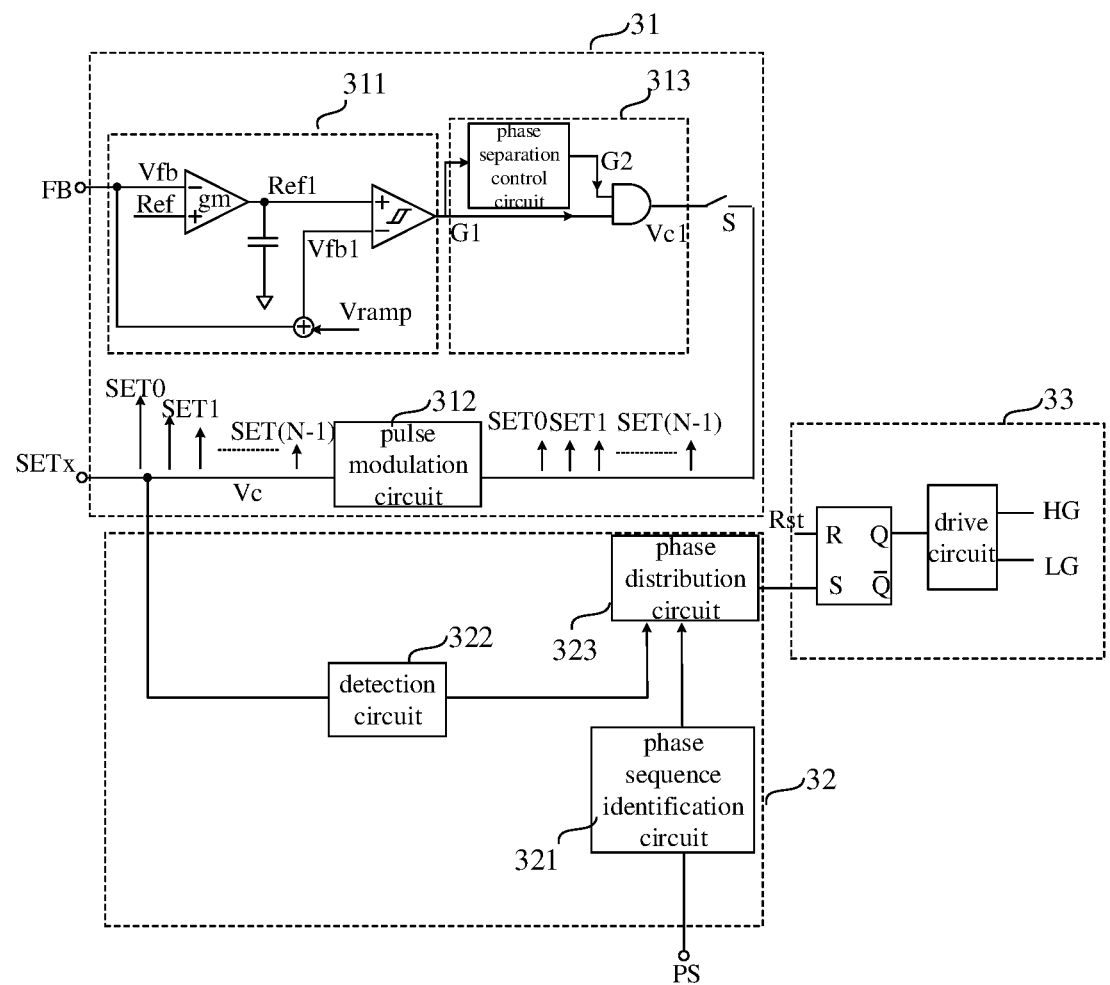
FIG. 6 shows a circuit diagram of a third example control circuit according to the embodiments of the present disclosure.

FIG. 6 shows a circuit diagram of a third example control circuit according to the embodiments of the present disclosure. In this embodiment, the pulse modulation circuit 312 and the signal selection circuit 32 are different from the second example control circuit shown in FIG. 4, and other circuits are the same as those in FIG. 4, and will not be described here.

As shown in FIG. 6, the pulse modulation circuit 312 is configured to modulate the first centralized control signal Vc1 so that the pulse amplitude of each pulse is different in a control period. The pulse modulation circuit 312 modulates the pulse amplitudes of the pulses SET0, SET1, . . . , SET(N-1) respectively according to N reference values. In this embodiment, the pulse amplitudes of the pulses SET0, SET1, . . . , SET(N-1) of the centralized control signal Vc in each control period are from high to low, and the pulse amplitude of SET0 is the highest. It should be understood that this embodiment only provides one of the modulation methods. The pulse amplitudes of the pulses in each control period may be arranged out of order, and any other arrangement is acceptable, as long as the pulse amplitudes of the pulses in each control period are different.

In this embodiment, the signal selection circuit 32 is configured to control the current power converter by gating the pulses in the centralized control signal Vc whose pulse amplitudes match the reference interval corresponding to the current phase sequence. In this embodiment, each phase sequence is preset with a corresponding reference interval. When the pulse amplitude of a pulse is within a certain reference interval, the phase sequence corresponding to the pulse is determined, so that the pulse corresponding to the phase sequence is selected according to the current phase sequence and is transmitted to the drive generating circuit. It should be understood that the reference values in the pulse modulation circuit 312 are in different reference intervals.

In some embodiments, the signal selection circuit 32 includes a phase sequence identification circuit 321, a detection circuit 322 and a phase distribution circuit 323. Similarly, the phase sequence identification circuit 321 is configured to identify the current phase sequence num according to the voltage information at the PS port. The detection circuit 322 is configured to determine the phase sequence corresponding to each pulse according to the reference interval to which the amplitude of each pulse in the centralized control signal Vc belongs, that is, the detection circuit 322 separately determines the reference interval corresponding to which phase sequence the pulse amplitude of each pulse in the centralized control signal Vc is in, and passes the pulse to a gating unit corresponding to the phase sequence in the phase distribution circuit 323. The phase distribution circuit 323 includes N gating units, which respectively receive corresponding pulse signals (SET0-SET(N-1)), and select the corresponding pulse signal to output according to the current phase sequence num.

In other embodiments, the signal selection circuit includes a phase identification circuit and a phase distribution circuit. Similarly, the phase sequence identification circuit is configured to identify the current phase sequence num according to the voltage information at the PS port. The phase distribution circuit may receive the current phase sequence num to obtain the reference interval corresponding to the current phase sequence, and select the pulse to output whose amplitude is within the reference interval.

It should be understood that the present disclosure only provides some embodiments for matching the phase sequence and the amplitude of the pulse, and any other circuits capable of realizing the same function are within the protection scope of the present invention.

Of course, if the pulse width is different in each control period, the implementation is similar to the above, and will not be described here.

Figure 7:
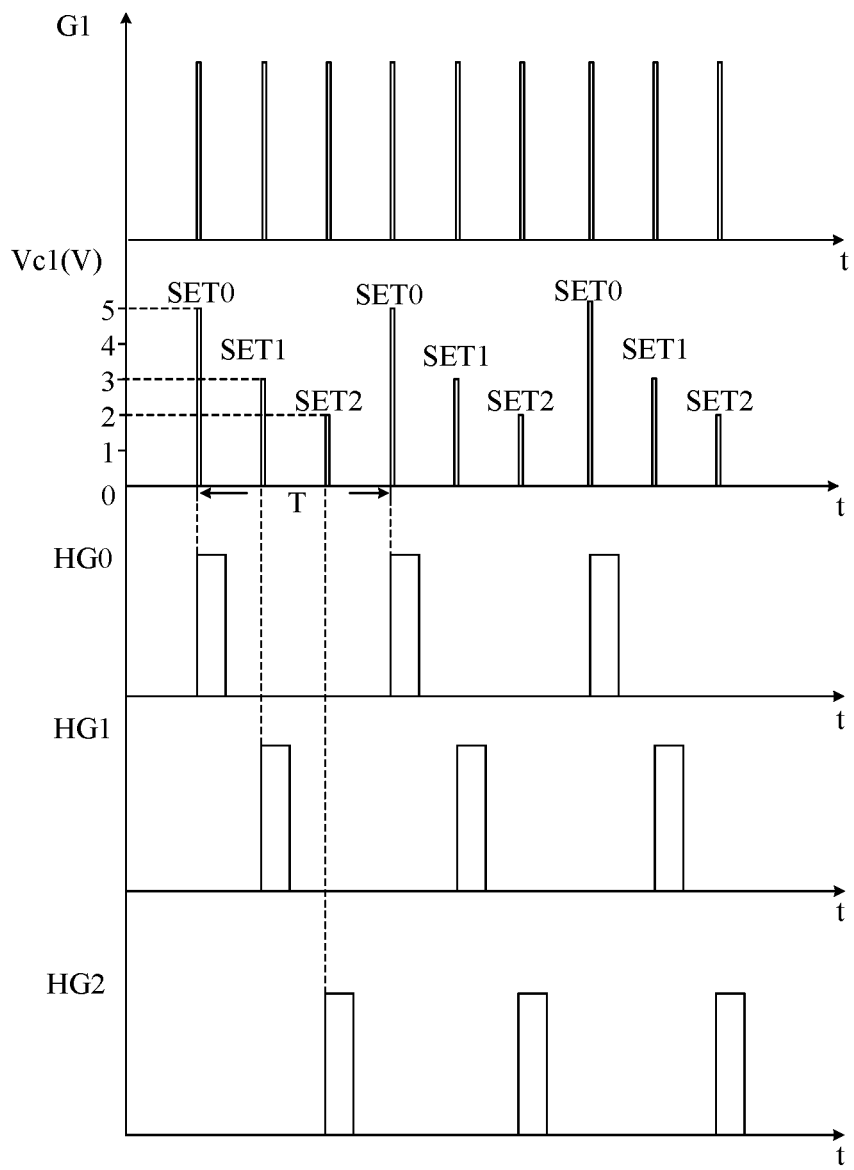
FIG. 7 shows a waveform graph of the third example control circuit according to the embodiments of the present disclosure.

FIG. 7 shows a waveform graph of the third control circuit according to the embodiments of the present disclosure. Take N=3 as an example. As shown in FIG. 7, the main control signal G1, the first centralized control signal Vc1, and the drive signals HG0-HG2 of each phase are sequentially from top to bottom. As shown in the figure, the first centralized control signal Vc1 includes pulses SET0, SET1, and SET2 in each control period T, wherein the pulse amplitude of each pulse is different after being modulated by the pulse modulation circuit. The pulse amplitude (level) of the initial pulse SET0 is 5V, which is in the reference interval corresponding to the phase sequence 0 of the main phase P0, and the pulse amplitude of the pulse SET1 is 3V, which is in the reference interval corresponding to the phase sequence 1 of the secondary phase P1, the pulse amplitude of SET2 is 2V, which is in the reference interval corresponding to phase sequence 2 of phase P2. Therefore, after the phase sequence identification circuit corresponding to the main phase P0 identifies that the current phase sequence is 0, the phase distribution circuit outputs the pulse SET0 to generate the drive signal HG0. Correspondingly, the phase distribution circuit in the phase P1 outputs the pulse SET1 to generate the drive signal HG1, and the phase distribution circuit in the phase P2 outputs the pulse SET2 to generate the drive signal HG2, thereby realizing the interleaved control of the multiphase power converter.

Figure 8:
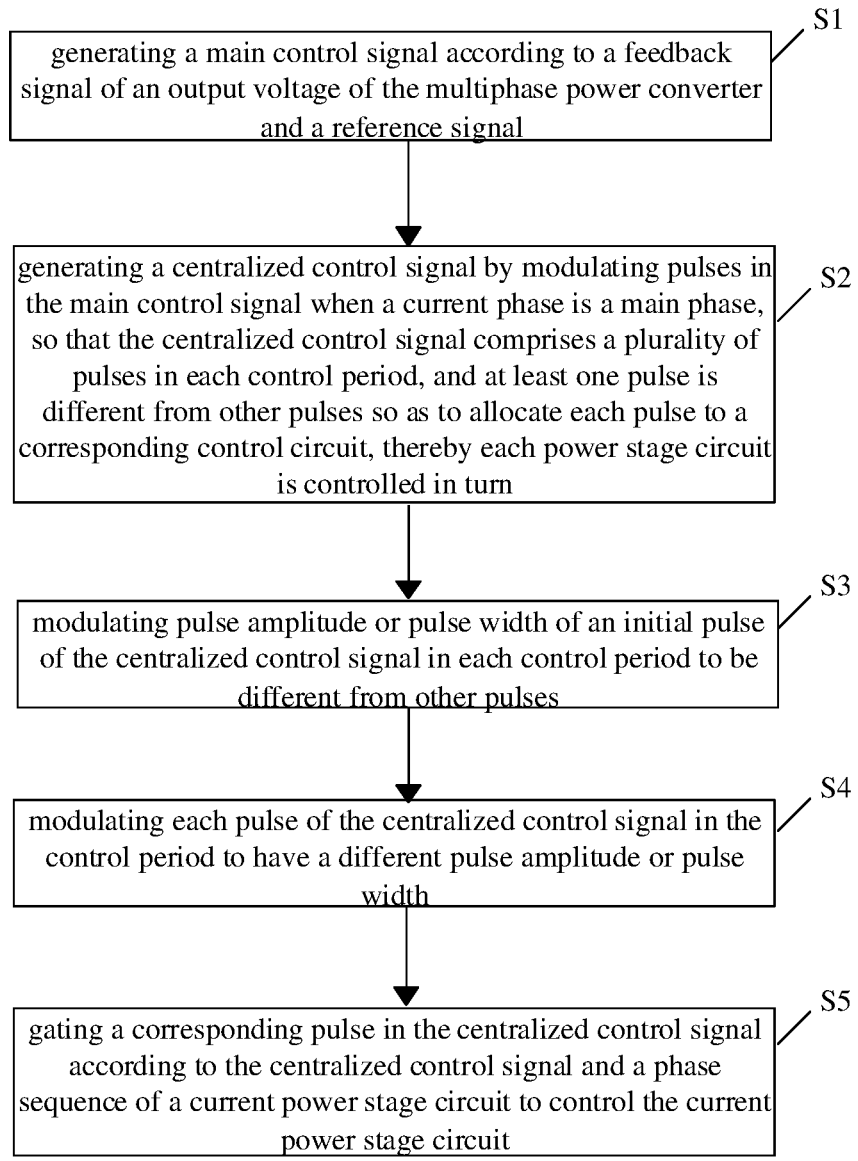
FIG. 8 shows a flowchart of a control method according to the embodiments of the present disclosure.

FIG. 8 shows a flowchart of a control method according to the embodiments of the present disclosure. The control method includes the following steps.

Step S1: generating a main control signal according to a feedback signal of an output voltage of the multiphase power converter and a reference signal.

Step S2: generating a centralized control signal by modulating pulses in the main control signal when a current phase is a main phase, so that the centralized control signal comprises a plurality of pulses in each control period, and at least one pulse is different from other pulses so as to allocate each pulse to a corresponding control circuit, thereby each power stage circuit is controlled in turn.

In order to improve a dynamic performance of the load, a pulse of the main control signal whose effective level time exceeds a first threshold is separated into a plurality of pulses with a same interval time without changing the pulse whose effective level time does not exceed the first threshold, thereby generating a first centralized control signal, and modulating a pulse of the main control signal to generate the centralized control signal when the control circuit is the main control circuit.

Step S3: modulating pulse amplitude or pulse width of an initial pulse of the centralized control signal in each control period to be different from other pulses.

Step S4: modulating each pulse of the centralized control signal in the control period to have a different pulse amplitude or pulse width.

Step S5: gating a corresponding pulse in the centralized control signal according to the centralized control signal and a phase sequence of a current power stage circuit to control the current power stage circuit.

Specifically, when the pulse amplitude or the pulse width of the initial pulse of the centralized control signal in each control period is different from other pulses, counting the pulses of the centralized control signal in each control period cyclically, and selecting a pulse whose count value matches a current phase sequence of the current power stage circuit to control the current power stage circuit. The count value is cleared when an arrival of each initial pulse is detected.

When the pulses of the centralized control signal in each control period have different pulse amplitudes or pulse widths, the pulse whose pulse amplitude or pulse width matches the reference interval corresponding to a current phase sequence is selected to control the current power stage circuit.

The above descriptions are only preferred embodiments of the present disclosure and are not used to limit the present disclosure. For those skilled in the art, the present disclosure can have various modifications and changes. Any modification, equivalent replacement, improvement, etc. made within the spirit and principle of the present disclosure should be included in the protection scope of the present disclosure.

What is claimed is:

1. A control circuit of a multiphase power converter, wherein the multiphase power converter comprises a plurality of power stage circuits, and each power stage circuit corresponds to one control circuit, the control circuit comprising:
    a first port coupled to first ports of the control circuits corresponding to other power stage circuits for transmitting a centralized control signal; and
    a second port configured to identify a phase sequence of the control circuit,
    wherein the centralized control signal comprises a plurality of pulses in each control period, and at least one pulse is different from other pulses so as to allocate each pulse to a corresponding control circuit, so that each power stage circuit is controlled in turn.

2. The control circuit according to claim 1, wherein the control circuit is configured to control a current power stage circuit by gating a corresponding pulse in the centralized control signal according to the centralized control signal and the phase sequence.

3. The control circuit according to claim 1, wherein in each of the control periods, the pulses of the centralized control signal have a same phase difference.

4. The control circuit according to claim 1, wherein in each of the control periods, the pulses of the centralized control signal are modulated to have at least two kinds of pulse amplitudes or pulse widths.

5. The control circuit according to claim 4, wherein an initial pulse of the centralized control signal in the control period has a pulse amplitude or a pulse width different from other pulses, wherein the initial pulse is configured to control the power stage circuit corresponding to a main converter.

6. The control circuit according to claim 4, wherein each pulse of the centralized control signal in the control period has a different pulse amplitude or pulse width.

7. The control circuit according to claim 1, wherein a resistive element is connected to the second port to identify the phase sequence of the control circuit according to a voltage or a current of the second port.

8. The control circuit according to claim 1, wherein the control circuit further comprises:
    a main control unit configured to generate the centralized control signal according to an output voltage of the multiphase power converter when the control circuit is a main control circuit; and
    a signal selection circuit configured to control a current power stage circuit by gating a corresponding pulse in the centralized control signal according to the centralized control signal and the phase sequence.

9. The control circuit according to claim 8, wherein the main control unit comprises:
    a feedback control circuit configured to generate a main control signal according to a reference signal and a feedback signal characterizing the output voltage of the multiphase power converter.

10. The control circuit according to claim 9, wherein the main control unit further comprises:
    a pulse modulation circuit configured to modulate pulses of the main control signal to generate the centralized control signal when the control circuit is the main control circuit.

11. The control circuit according to claim 9, wherein the main control unit further comprises:
    a phase separation control circuit connected to the feedback control circuit, is configured to disperse a pulse of the main control signal whose effective level time exceeds a first threshold into a plurality of pulses with a same interval time without changing the pulse whose effective level time does not exceed the first threshold, thereby generating a first centralized control signal;
    a pulse modulation circuit configured to modulate pulses of the first centralized control signal to generate the centralized control signal when the control circuit is the main control circuit.

12. The control circuit according to claim 8, wherein the signal selection circuit is configured to count the pulses of centralized control signal in each control period and select a pulse whose count value matches a current phase sequence to control the current power stage circuit.

13. The control circuit according to claim 12, wherein the signal selection circuit comprises:
    a phase sequence identification circuit configured to identify the current phase sequence according to a voltage or a current of the second port;
    a counting circuit configured to count the pulses of the centralized control signal in each control period;
    a detection circuit configured to clear the count value when an arrival of each initial pulse is detected; and a phase distribution circuit configured to select the pulse whose count value matches the current phase sequence to output.

14. The control circuit according to claim 8, wherein the signal selection circuit is configured to select a pulse in the centralized control signal whose pulse amplitude or pulse width matches a reference interval corresponding to a current phase sequence to control the current power stage circuit.

15. The control circuit according to claim 14, wherein the signal selection circuit comprises:
a phase sequence identification circuit configured to identify a current phase sequence according to a voltage or a current of the second port; and
a phase distribution circuit configured to receive the current phase sequence to obtain the reference interval corresponding to the current phase sequence, and select the pulse whose pulse amplitude or pulse width belong to the reference interval to output, so as to control the current power stage circuit.

16. The control circuit according to claim 14, wherein the signal selection circuit comprises:
a phase sequence identification circuit configured to identify a current phase sequence according to a voltage or a current of the second port; a detection circuit configured to determine the phase sequence corresponding to the pulse according to the reference interval to which the pulse amplitude or the pulse width of each pulse in the centralized control signal belongs, wherein each phase sequence is respectively set with a corresponding reference interval; and
a phase distribution circuit configured to select the pulse to output whose pulse amplitude or pulse width matches a reference interval corresponding to a current phase sequence to control the current power stage circuit.

17. A multiphase power converter, comprising:
a plurality of power stage circuits connected in parallel, wherein an input port of each power stage circuit is coupled to an input voltage, and an output port is coupled to a load; and
a plurality of control circuits according to claim 1, wherein each of the power stage circuit corresponds to one of the control circuits, and one of the plurality of control circuits is configured as the main control circuit, the rest control circuits are configured as secondary control circuits.

18. A control method of a multiphase power converter, comprising:
generating a centralized control signal according to an output voltage of the multiphase power converter; and
gating a corresponding pulse in the centralized control signal according to the centralized control signal and a phase sequence of a current power stage circuit to control the current power stage circuit,
wherein the centralized control signal comprises a plurality of pulses in each control period, and at least one pulse is different from other pulses so as to allocate each pulse to a corresponding control circuit, so that each power stage circuit is controlled in turn.

19. The control method according to claim 18, further comprising:
generating a main control signal according to a reference signal and a feedback signal characterizing the output voltage of the multiphase power converter; and
modulating pulses of the main control signal to generate the centralized control signal when the control circuit is the main control circuit.

20. The control method according to claim 19, wherein when effective level time of a pulse of the main control signal exceeds a first threshold, the pulse is dispersed into a plurality of pulses with a same interval time before modulating.

21. The control method according to claim 19, further comprising:
modulating pulse amplitude or pulse width of an initial pulse of the centralized control signal in each control period to be different from other pulses.

22. The control method according to claim 21, further comprising:
counting the pulses of the centralized control signal in each control period;
clearing a count value when an arrival of each initial pulse is detected; and
controlling the current power stage circuit by selecting a pulse whose count value matches a current phase sequence to output.

23. The control method according to claim 19, further comprising:
modulating each pulse of the centralized control signal in the control period to have a different pulse amplitude or pulse width.

24. The control method according to claim 23, further comprising:
setting a reference interval corresponding to each phase sequence; and
selecting the pulse whose pulse amplitude or pulse width matches the reference interval corresponding to a current phase sequence to control the current power stage circuit.

* * * * *